United States Patent [19]

Charnoske

[11] 4,393,617
[45] Jul. 19, 1983

[54] ANIMAL TRAP SIGNAL APPARATUS

[76] Inventor: Nicky L. Charnoske, 1450 Sheldon St., Alger, Mich. 48601

[21] Appl. No.: 270,603

[22] Filed: Jun. 5, 1981

[51] Int. Cl.³ .......................................... A01M 23/26
[52] U.S. Cl. ..................................... 43/96; 43/100; 441/6
[58] Field of Search ............... 43/96, 25, 17, 58, 100, 43/102; 441/6, 23

[56] References Cited

U.S. PATENT DOCUMENTS

| | | | |
|---|---|---|---|
| 1,154,756 | 9/1915 | Georgeson | 43/96 X |
| 3,017,715 | 1/1962 | Kennedy | 43/16 |
| 3,055,139 | 9/1962 | Condello | 43/61 |
| 3,508,358 | 4/1970 | Lee | 43/60 |
| 3,772,818 | 11/1973 | Gardina | 43/100 |
| 3,973,347 | 8/1976 | Kearney | 43/17 |
| 4,246,716 | 1/1981 | Elmer | 43/17 |
| 4,290,159 | 9/1981 | McLennan et al. | 43/25 X |

FOREIGN PATENT DOCUMENTS 552898 2/1958 Canada ................................. 43/25

Primary Examiner—Nicholas P. Godici
Assistant Examiner—J. Reed Batten, Jr.
Attorney, Agent, or Firm—Basile, Weintraub & Hanlon

[57] ABSTRACT

A signal apparatus for use with an animal trap positionable underwater includes an open ended housing adapted to be secured in a substantially vertical position to a stationary portion of the trap. A movable cover releasably closes the open end of the housing. A connecting member connects the cover to a movable portion of the animal trap to uncover the open end of the housing when the trap is sprung. A buoyant float is disposable within the housing. An elongated attaching member connects the float to the housing enabling it to rise to the surface of the water when the trap has been sprung to provide an indication of the condition of the trap.

5 Claims, 2 Drawing Figures

ANIMAL TRAP SIGNAL APPARATUS

BACKGROUND OF THE INVENTION

1. Field of the Invention:

This invention relates, in general, to animal traps and, more specifically, to animal traps incorporating signal apparatus for indicating the condition of the trap.

2. Description of the Prior Art:

Animal traps including at least one movable jaw or arm are well known for catching a wide variety of aquatic mammals, such as muskrat, mink, beaver, otter, etc. Such traps are typically set and located underwater in a secure position to catch the animals in their natural habitat.

However, since such traps are positioned underwater, it is difficult, if not impossible, to easily observe the trap to see if it has been sprung or if an animal has been caught without pulling the trap out of the water. This is especially problemsome in winter when ice and snow accumulate on the water's surface to further block the view of the trap. Previously, the only way possible to see if the trap had been sprung or was still in a set condition was to raise the trap to the surface of the water. This not only required a considerable amount of effort, especially in winter, but also disturbed the trap and its surroundings which has caused a decrease in the efficiency of the trap.

What is needed is a signal apparatus which would provide an indication of the condition of the trap, i.e., whether it has been sprung or is still set while the trap is still positioned in the desired location underwater. Heretofore, signal apparatus has not been devised for use with animal traps adapted to trap and catch aquatic mammals.

Various types of signal apparatus have been applied to fish catching devices. These signal apparatus in one version are located at the surface of the water and include a movable flag, a light or various acoustic means to provide an indication when a predetermined amount of force has been applied to the fishing line to indicate that a fish has been caught on the hook.

Other types of signal apparatus are located below the surface of the water and include releasable floats which rise to the surface when a fish has been caught on the hook. This type of signal apparatus has also been applied to traps for crustaceans, such as crabs, lobsters, etc.

Although signal devices have proven effective with fishing apparatus, such previously devised signal apparatus are unsuited for use with animal traps for several reasons. For one, the animal traps incorporate a completely different type of trap mechanism which contains relatively few parts thereby limiting the possible positions that a signal device may be mounted thereon. For another, the previously devised signal apparatus are used to sense movement of a fishing line which is located remote from the actual catching device, such as the hook. In an animal trap, substantially the entire trap mechanism is used to trap the animal which, again, prevents the application of such signal apparatus with animal traps.

Thus, it would be desirable to provide a signal apparatus which is usable with an animal trap adapted to be positioned underwater for trapping and catching aquatic mammals. It would also be desirable to provide a signal apparatus for use with an animal trap having at least one movable jaw or arm. It would also be desirable to provide a signal apparatus which is adapted for use with a wide variety of animal traps. Finally, it would be desirable to provide a signal apparatus which provides an indication of the condition of an animal trap which is located underwater without the need for raising the trap to the surface to visually check its condition.

SUMMARY OF THE INVENTION

The present invention comprises a signal apparatus for use with animal traps which are positionable underwater and incorporate at least one movable arm. The signal apparatus includes an open-ended housing which is adapted to be attached in a substantially vertical orientation on the trap. A movable cover member is provided for releasably closing the open end of the housing. Connecting means adapted to connect the cover member to a movable portion of the animal trap is provided for moving the cover member to a position uncovering the open end of the housing when the trap has been sprung. A buoyant float is disposable within the housing. Means for extensibly attaching the float to the housing is provided such that the float can rise to the surface of the water when the trap has been sprung to provide an indication of the condition of the trap.

In the preferred embodiment, the housing is in the form of a cylindrical member having an open end and a slot extending substantially completely around the circumference thereof adjacent the open end. The cover member is in the form of a planar tab which is removably inserted within the slot to close the open end of the housing and retain the buoyant float therein. The planar tab is connected to a movable portion of the trap, such as the movable jaw or arm, and is pulled from the slot by movement of the arm to the closed, sprung position thereby opening the end of the housing and enabling the float to rise to the surface of the water.

The animal trap signal apparatus of the present invention uniquely provides an indication of the condition of an animal trap which is positioned underwater without the need for the trap being raised to the water's surface as previously required. The signal apparatus is adapted for use with a wide variety of animal traps which incorporate at least one movable jaw or arm and may be secured to such traps in a variety of positions thereby expanding the application of the signal apparatus of the present invention.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
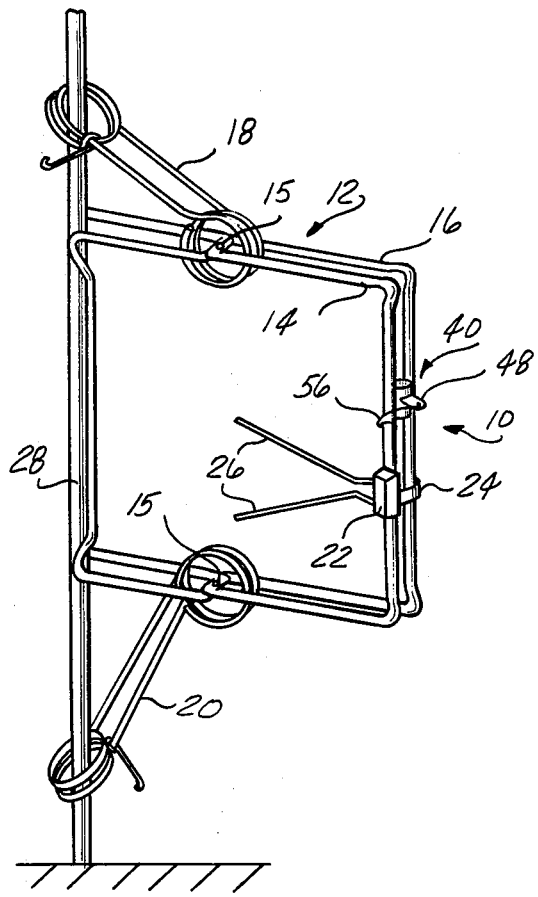
FIG. 1 is a perspective view of an animal trap having a signal apparatus constructed in accordance with the teachings of the present invention secured thereto.

Throughout the following description and drawing, an identical reference number is used to refer to the same component shown in multiple figures of the drawing.

Referring now to the drawing, and to FIG. 1 in particular, there is depicted a signal apparatus 10 adapted for use with an animal trap 12 positionable underwater and including at least one movable arm.

The animal trap 12 is of conventional construction and is adapted to be secured in position underwater in order to catch and trap a wide variety of aquatic mammals, such as muskrat, mink, beaver, otter, etc. By way of illustration and not limitation, the animal trap 12 is formed with first and second rod-like members 14 and 16 which are bent into a substantially rectangular configuration with four legs. At least one of the rectangular members 14 or 16 is movable with respect to the other of the rectangular members 14 or 16. In the embodiment illustrated in FIG. 1, both members 14 and 16 are adapted for movement between a set position and a closed or "sprung" position.

The two members 14 and 16 are pivotally connected together at two points by pivot pins 15 which extend through opposed legs of the members 14 and 16. When triggered, the two members 14 and 16 move in opposed directions about the pivot pins 15 to a closed position wherein opposed legs are in proximity with each other to trap and catch an animal therebetween.

Biasing means, preferably in the form of a pair of coil springs 18 and 20, are provided for biasing the movable members 14 and 16 to the closed position.

A conventional trigger mechanism 22 is attached to the movable member 14 and includes a hook-like arm 24 which is adapted to be disposed around one leg of the member 16 when the trap 12 is set. The trigger mechanism 22 includes a pair of elongated sensor arms 26 which are moved by the animal entering the trap 12. The sensor arms 26 cause a release of the trigger mechanism 22 thereby enabling the members 14 and 16 to pivot to the closed position to catch the animal.

As illustrated in FIG. 1, the trap 12 is secured in a fixed position by disposing the biasing means 18 and 20 around a suitably positioned post 28. It is also possible to orient the trap 12 in a variety of other positions as desired.

Although the signal apparatus 10 of the present invention is illustrated in conjunction with the trap 12, it is also usable with other types of animal traps such as those incorporating one movable arm or member.

Figure 2:
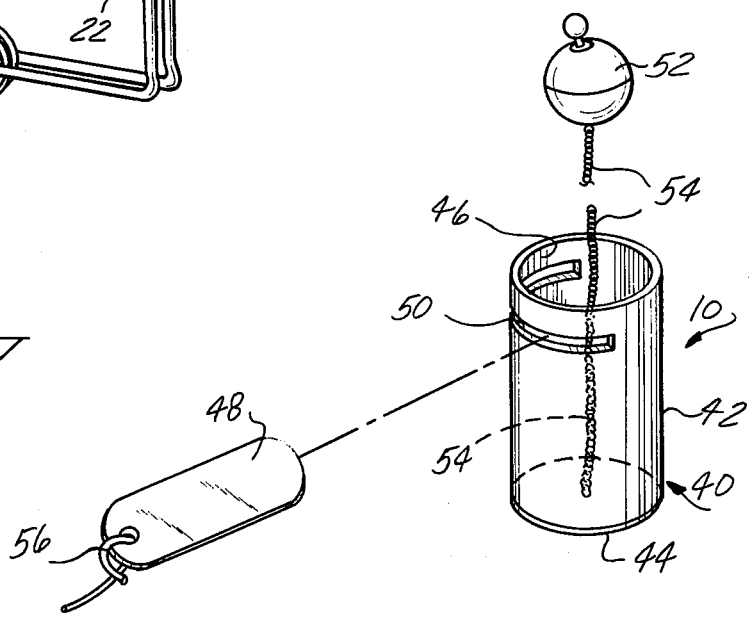
FIG. 2 is an exploded perspective view of the signal apparatus of the present invention.

As shown in FIG. 1, and in greater detail in FIG. 2, the signal apparatus 10 is provided for use with the animal trap 12 to provide an indication of the condition of the trap 12, i.e., whether the trap 22 is set or sprung. In general, the signal apparatus 10 includes a housing having an open end which is adapted to be secured to the trap. A movable cover member is provided for releasably covering the open end of the housing. A buoyant float is disposable within the housing and is releasably attached thereto by means of an extensible member, such as a chain. A connecting means, adapted to be connected to the cover member and a movable portion of the trap 12, is provided for moving the cover member to a position uncovering the open end of the housing and releasing the buoyant float from the housing in response to the closing of the trap.

Specifically, the housing 40 of the signal apparatus 10 has a substantially cylindrical form with a circular cross-section. The housing 40 is formed with side walls 42 and includes a base plate 44 which is secured to one end of the side walls 42 to close the bottom end of the housing 40.

The housing 40 may be formed of any material suitably adapted for use in a water environment and is preferably constructed from a corrosion or rust resistant material. Specifically, the housing 40 is formed of stainless steel or a suitable plastic.

The housing 40 is adapted to be secured in a variety of positions on the animal trap 12. However, the housing 40 must always be oriented in a substantially vertical position with the open top end 46 uppermost so as to enable an easy release of the buoyant float therefrom, as described in greater detail hereafter. Thus, the housing 40 may be mounted as shown in FIG. 1. Alternately, the housing 40 of signal apparatus 10 may be secured to one of the biasing springs 18 or 20.

A movable cover member 48 is provided for releasably closing the open end 46 of the housing 40. In the preferred embodiment, the cover member 48 is in the form of a flat or planar tab which is constructed of the same material as the housing 40. The tab 48 has a width less than the diameter of the housing 40.

In the preferred embodiment, the housing 40 is constructed with an elongated slot 50 which is located adjacent the open top end 46 and extends substantially around the entire periphery or circumference of the housing 40. The cover member 48 is adapted to be removably inserted within the slot 50 to close the open end 46 of the housing 40 and retain the float 52 therein.

As shown in FIG. 2, a buoyant float 52 is adapted to be releasably disposed within the housing 40. Ideally, the buoyant float 52 is in the form of a hollow spherical ball which is constructed of a suitable plastic material to rise quickly to the surface of the water upon its release from the housing 40.

Means 54 for extensibly attaching the float 52 to the housing 40 is provided such that the float 52 can rise to the surface of the water upon its release from the housing 40. Preferably, the attaching means 54 is in the form of an elongated chain or line and is connected between the float 52 and the interior of the housing 40. Preferably, the end of the attaching means 54 is secured, such as by welding or soldering, to the bottom plate 44 of the housing 40. The elongated attaching means 54 has a length sufficient to enable the float 52 to rise from the housing 40 to the surface of the water when the animal trap 12 having the signal apparatus 10 mounted thereon is secured in the desired position underwater.

As shown in FIGS. 1 and 2, means, denoted in general by reference number 56, is provided for connecting the cover member 48 to a movable portion of the animal trap 12, such as the movable arm 14, such that the cover member 48 is movable to a position uncovering the open end 46 of the housing 40 and releasing the float 52 therefrom in response to the closing of the trap 12. In a preferred embodiment, the connecting means 56 is in the form of an elongated wire which is secured at one end to the cover member 48 and at the other end to the movable portion of the animal trap 12, such as the member leg 14.

In use, when the trap 12 has been sprung by an animal triggering the sensor arms 26, the movable members 14 and 16 will be released from the set position and begin to pivot under the influence of the biasing means 18 and 20 to a closed or sprung position. In so moving, the movable member 14 will pull the cover member 48 from the slot 50 in the housing 40 thereby opening the top end 46 of the housing 40. This releases the buoyant float 52 from the housing 40 enabling it to rise to the surface of the water and provide an indication that the trap has been sprung.

The animal trap signal apparatus disclosed herein provides a unique indication that an animal trap positionable underwater for trapping and catching aquatic mammals has been sprung thereby eliminating the need for raising the trap to the surface to check its operative condition. The signal apparatus of the present invention is adapted for use with a wide variety of underwater animal traps and is positionable in a variety of positions for increased flexibility of use.

What is claimed is:

1. A signal apparatus for use with an animal trap positionable underwater and having at least one movable portion comprising:
    a housing having an open end, the housing adapted to be attached to the animal trap in a substantially vertical orientation with the open end uppermost;
    a movable cover member for releasably closing the open end of the housing;
    a buoyant float disposable within the housing;
    means for extensibly attaching the buoyant float to the housing such that the buoyant float can rise to the surface of the water when released from the housing; and
    means for connecting the cover member to a movable portion of the animal trap such that the cover member is movable to a position uncovering the open end of the housing and releasing the buoyant float therefrom in response to the closing of the animal trap.

2. The signal apparatus of claim 1 wherein:
    the housing includes a slot located adjacent the open end thereof; and
    the cover member comprises a planar tab removably insertable within the slot to close the open end of the housing.

3. The signal apparatus of claim 1 wherein the housing comprises a cylindrical member having closed bottom and open top ends.

4. The signal apparatus of claim 1 wherein the attaching means comprises an elongated chain.

5. A signal apparatus for use with an animal trap positionable underwater and having at least one movable portion comprising:
    a cylindrical housing having an open end, the housing adapted to be attached to a stationary portion of the animal trap in a substantially vertical orientation with the open end uppermost, the housing having a slot formed about a portion of its circumference adjacent the open end;
    a planar tab removably insertable within the slot for releasably closing the open end of the housing;
    a buoyant float disposable within the housing;
    an extensible member connected to the float at one end and to the interior of the housing at the other end such that the buoyant float can rise to the surface of the water when released from the housing; and
    means for connecting the tab to a movable portion of the animal trap such that the tab is removed from the slot in the housing uncovering the open end of the housing and releasing the buoyant float therefrom in response to a closing of the animal trap.

* * * * *